United States Patent
Gao et al.

(10) Patent No.: US 10,712,046 B2
(45) Date of Patent: Jul. 14, 2020

(54) VENTILATOR MOUNTING BRACKET

(71) Applicant: AUPU Home Style Corporation Limited., Hangzhou, Zhejiang Province (CN)

(72) Inventors: Shouyong Gao, Hangzhou (CN); Jian Chen, Hangzhou (CN); Jianli Xu, Hangzhou (CN); Kong Zhang, Hangzhou (CN)

(73) Assignee: AUPU HOME STYLE CORPORATION LIMITED., Hangzhou, Zhejiang Province (CN)

( * ) Notice: Subject to any disclaimer, the term of this patent is extended or adjusted under 35 U.S.C. 154(b) by 29 days.

(21) Appl. No.: 16/184,662

(22) Filed: Nov. 8, 2018

(65) Prior Publication Data

US 2019/0331362 A1 Oct. 31, 2019

(30) Foreign Application Priority Data

Apr. 27, 2018 (CN) .......................... 2018 1 0390834
Apr. 27, 2018 (CN) ...................... 2018 2 0617441 U

(51) Int. Cl.
*F24F 13/32* (2006.01)
*F16M 13/02* (2006.01)
*F24F 7/06* (2006.01)

(52) U.S. Cl.
CPC ........... *F24F 13/32* (2013.01); *F16M 13/027* (2013.01); *F24F 7/06* (2013.01); *F24F 2221/14* (2013.01)

(58) Field of Classification Search
CPC ........ F24F 13/32; F04D 25/12; F04D 25/088; F04D 29/601; F04D 29/646; F04D 29/624; F04D 29/626; H02G 3/125; H02G 3/20
See application file for complete search history.

(56) References Cited

U.S. PATENT DOCUMENTS 1,982,957 A * 12/1934 Knell ...................... H02G 3/126
                                                            220/3.9
5,386,959 A * 2/1995 Laughlin ................ H02B 1/015
                                                            248/200.1

(Continued)

*Primary Examiner* — Eret C McNichols
(74) *Attorney, Agent, or Firm* — Muncy, Geissler, Olds & Lowe, P.C.

(57) ABSTRACT

The present invention discloses a ventilator mounting bracket, belonging to device installation brackets. Existing ventilator mounting brackets are smaller in adjustable distance range, difficult in installation and fixation and low in efficiency. The ventilator mounting bracket of the present invention is provided with two telescoping rod components which can extend and shorten and two folding rod components which are connected between the two telescoping rod components and can be folded and unfolded; the two folding rod components are unfolded to stretch the two telescoping rod components such that the two telescoping rod components and the two folding rod components form a mounting hole for mounting a ventilator; the two folding components are folded to withdraw the two telescoping rod components for packaging and transportation; moreover, the two ends of each one of the two telescoping rod components can be fixed at corresponding fixed parts by adjusting the length of the telescoping rod components. The mounting bracket can be conveniently and efficiently installed in new and hold houses, has a relatively large adjustable distance range, and can ensure that ventilators are installed in any position and reduce the installation time and installation cost of the ventilators.

13 Claims, 15 Drawing Sheets

(56) References Cited

U.S. PATENT DOCUMENTS

| | | | | |
|---|---|---|---|---|
| 5,505,419 A * | 4/1996 | Gabrius | ................ | H02G 3/125 |
| | | | | 248/343 |
| 6,033,098 A * | 3/2000 | Hentz | ................ | B62J 6/00 |
| | | | | 248/228.7 |
| 6,286,265 B1 * | 9/2001 | Rinderer | ................ | E04B 9/006 |
| | | | | 52/28 |
| 6,341,466 B1 * | 1/2002 | Kehoe | ................ | E04B 9/006 |
| | | | | 24/292 |
| 6,729,083 B1 * | 5/2004 | Soyko | ................ | E04D 13/0305 |
| | | | | 248/298.1 |
| 7,857,275 B2 * | 12/2010 | de la Borbolla | ................ | H02G 3/125 |
| | | | | 174/58 |
| 8,475,014 B2 * | 7/2013 | Jones | ................ | F21V 21/048 |
| | | | | 248/220.22 |
| 8,961,126 B1 * | 2/2015 | Tom | ................ | F24F 13/078 |
| | | | | 415/213.1 |
| 9,194,602 B2 * | 11/2015 | Hu | ................ | F24F 13/20 |
| 10,012,366 B2 * | 7/2018 | Belmonte | ................ | F21V 21/048 |
| 10,295,163 B1 * | 5/2019 | Cohen | ................ | F21S 8/026 |
| 10,541,522 B2 * | 1/2020 | Lalancette | ................ | F21V 21/048 |
| 2005/0230589 A1 * | 10/2005 | Wronski | ................ | F21V 21/048 |
| | | | | 248/323 |
| 2005/0247842 A1 * | 11/2005 | Wronski | ................ | F21V 21/04 |
| | | | | 248/323 |
| 2007/0075206 A1 * | 4/2007 | Wright | ................ | F04D 25/088 |
| | | | | 248/343 |
| 2008/0011928 A1 * | 1/2008 | Adrian | ................ | H02G 3/20 |
| | | | | 248/343 |
| 2010/0165646 A1 * | 7/2010 | Russo | ................ | F21S 8/02 |
| | | | | 362/430 |
| 2011/0073017 A1 * | 3/2011 | Wilson, Jr. | ................ | F24F 1/60 |
| | | | | 108/42 |
| 2013/0026334 A1 * | 1/2013 | Long | ................ | F04D 25/08 |
| | | | | 248/675 |
| 2015/0060638 A1 * | 3/2015 | Hu | ................ | F24F 13/20 |
| | | | | 248/674 |

* cited by examiner

VENTILATOR MOUNTING BRACKET

BACKGROUND OF THE INVENTION

Technical Field

The present invention belongs to device mounting brackets, and specifically relates to a mounting bracket for ceiling ventilators.

Description of the Related Art

Ventilators commercially available on the market can be mounted by many ways, and mounting brackets for ventilators vary with mounting methods. Through analysis on the usage and efficiency of existing mounting brackets, it is found that some mounting brackets have defects such as difficult installation and fixation, that some mounting brackets can be used during decoration of only new houses or can be used only after the existing ceiling opening sizes are changed during renovation of old houses, and that some mounting brackets apply to certain fixed positions or are small in adjustable distance range during installation. The flexibility of use of the mounting brackets is affected.

BRIEF SUMMARY OF THE INVENTION

The technical problem to be solved by and the technical task put forward by the present invention is to provide a ventilator mounting bracket which can be conveniently and efficiently installed in new and old houses, has a relatively large adjustable distance range, can ensure that ventilators can be installed at any position, and can reduce the installation time and installation cost of the ventilators, to overcome the defects of the existing ventilator mounting brackets such as small adjustable distance range, difficulties in installation, low efficiency and difficulties in fixation.

To achieve the above objectives, the present invention provides a ventilator mounting bracket, characterized by including two telescoping rod components which can extend and shorten and two folding rod components which are connected between the two telescoping rod components and are capable of being folded and unfolded, wherein the two folding rod components are unfolded to stretch the two telescoping rod components such that the two telescoping rod components and the two folding rod components form a mounting hole; and the two folding rod components are folded to drive the two telescoping rod components to withdraw.

As a preferred technical means, each one of the telescoping rod components includes a first telescoping rod, a second telescoping rod and a sliding rod; each one of the first telescoping rods and each corresponding one of the second telescoping rods are assembled together in a telescoping way; each one of the sliding rods is assembled in a sliding way on the outer side of each corresponding one of the first telescoping rods and on the outer side of each corresponding one of the second telescoping rods; a fixture is respectively arranged at the outer end of each one of the first telescoping rods and the outer end of each one of the second telescoping rods; and the two ends of each one of the two folding rod components are respectively rotationally connected to the sliding rods of the two telescoping rod components.

As a preferred technical means, the first telescoping rods and the second telescoping rods are both shaped like square pipes; each one of the first telescoping rods and each corresponding one of the second telescoping rods are sleeved together to realize telescoping assembling; each one of the sliding rods is shaped like a square pipe and is externally sleeved on each corresponding one of the first telescoping rods and each corresponding one of the second telescoping rods to realize sliding assembly with each corresponding one of the first telescoping rods and each corresponding one of the second telescoping rods.

As a preferred technical means, a slot or a slit is formed at the bottom face of each one of the sliding rods, and the two edges of the slot or slit are symmetrical threaded-connection folding sides.

As a preferred technical means, the threaded-connection folding sides are bent upward.

As a preferred technical means, the bottom face of each one of the first telescoping rods and the bottom face of each one of the second telescoping rods are respectively provided with a concession slot or a concession slit corresponding to the slot or slit.

As a preferred technical means, the inner end of each one of the first telescoping rods and the inner end of each one of the second telescoping rods are respectively formed with a pit and a projection, and each one of the projections is inserted into each corresponding one of the pits to avoid separating the first telescoping rods from each corresponding one of the second telescoping rods.

As a preferred technical means, the fixtures are vertical portions which are arranged at the outer end of each corresponding one of the first telescoping rods and at the outer end of each corresponding one of the second telescoping rods and extend upward, and each one of the vertical portions is formed with a fastening hole.

As a preferred technical means, each one of the vertical portions is provided with a structure reinforcing portion, and each one of the fastening holes is formed on each corresponding one of the structure reinforcing portions.

As a preferred technical means, each one of the vertical portions is provided with a positioning sheet which is bent outward.

As a preferred technical means, each one of the sliding rods is provided with a positioning flange on a lateral face toward the mounting hole.

As a preferred technical means, the first telescoping rods, the second telescoping rods and the sliding rods are all made by blanking and bending sheet materials.

As a preferred technical means, each one of the folding rod components includes a first folding rod and a second folding rod; one end of each one of the first folding rods is in a rotational connection with one end of each corresponding one of the second folding rods, while the other end of each one of the first folding rods and the other end of each one of the second folding rods are respectively rotationally connected to the sliding rods of the two telescoping rod components.

As a preferred technical means, each one of the sliding rods is provided with a pivoting seat at each one of the two ends of the lateral face which face the mounting hole; the other end of each one of the first folding rods is rotationally connected to the pivoting seat on the sliding rod of one of the telescoping rod components, and the other end of each one of the second folding rods is rotationally connected to the pivoting seat on the sliding rod of the other telescoping rod component.

As a preferred technical means, each one of the pivoting seats includes a vertical folding side and two transverse folding sides which are bent toward the mounting hole symmetrically from the top and bottom edges of the vertical folding side and perform rotational connection.

As a preferred technical means, the ends, in adjacent connection with the transverse folding sides, of each one of the vertical folding sides respectively extend up and down to form positioning blocking portions.

As a preferred technical means, each one of the first folding rods and the second folding rods includes vertical walls and transverse walls which are formed by symmetrically bending from the upper and lower edges of the corresponding vertical walls; the vertical walls and the transverse walls form a groove which has a square cross section and faces a lateral face; the two ends of each one of the transverse walls extend to form connecting lugs; the connecting lug of one end of each one of the first folding rods is rotationally connected through a shaft with the connecting lug of one end of each one of the second folding rods, the connecting lug of the other end of each one of the first folding rods is rotationally connected through a shaft with the transverse folding edges of one of the sliding rods, and the connecting lug at the other end of each one of the second folding rods is connected through a shaft with the connecting lug at the transverse folding edges of the other sliding rod.

As a preferred technical means, the first folding rods and the second folding rods are all made by blanking and bending sheet materials.

The ventilator mounting bracket is provided with two telescoping rod components which can extend and shorten and two folding rod components which are connected between the two telescoping rod components and are capable of being folded and unfolded; the two folding rod components are unfolded to stretch the two telescoping rod components such that the two telescoping rod components and the two folding rod components form the mounting hole for mounting a ventilator; and the two folding rod components are folded to drive the two telescoping rod components to withdraw for packaging and transportation; moreover, the two ends of each one of the telescoping rod components can be conveniently fixed at the corresponding fixed positions (for example, on a beam) by adjusting the length of the telescoping rod components.

The mounting bracket can be conveniently and effectively installed in new and old houses, has a relatively large adjustable distance range, can ensure that ventilators can be installed at any position, and can reduce the installation time and installation cost of the ventilators.

The mounting bracket can be folded and telescoped to increase the flexibility of controllability thereof, so that the mounting bracket is more easily placed in ceilings, brings convenient in installation in old houses, reduces difficulties in operation, and makes installation convenient.

DESCRIPTION OF MARKS IN THE DRAWINGS

01-Telescoping rod component;
11-First telescoping rod; 111-Concession hole; 112-Projection;
12-Second telescoping rod; 121-Concession hole; 122-Pit;
13-Sliding rod; 131-Slot; 132-threaded-connection folding side; 133-Positioning blocking edge; 134-Pivoting seat; 135-Vertical folding side; 136-Transverse folding side; 137-Positioning blocking portion;
02-Folding rod component;
21-First folding rod; 211-Connecting lug; 212-Vertical wall; 213-Transverse wall;
22-Second folding rod; 221-Connecting lug; 222-Vertical wall; 223-Transverse wall;
03-Mounting hole;
04-Fixture;
41-Vertical portion; 411-Fastening hole; 412-Structural reinforcing portion 413-Positioning sheet;
05-Ventilator;
51-Case; 511-Convex portion; 512-Flanged edge; 513-Clamping hole;
52-Air pipe interface portion; 521-Protrusion; 522-Flanged edge;
06-Beam;
07-Ceiling panel.

DETAILED DESCRIPTION OF THE INVENTION

The present invention is described in further detail in conjunction with the attached drawings.

Figure 1:
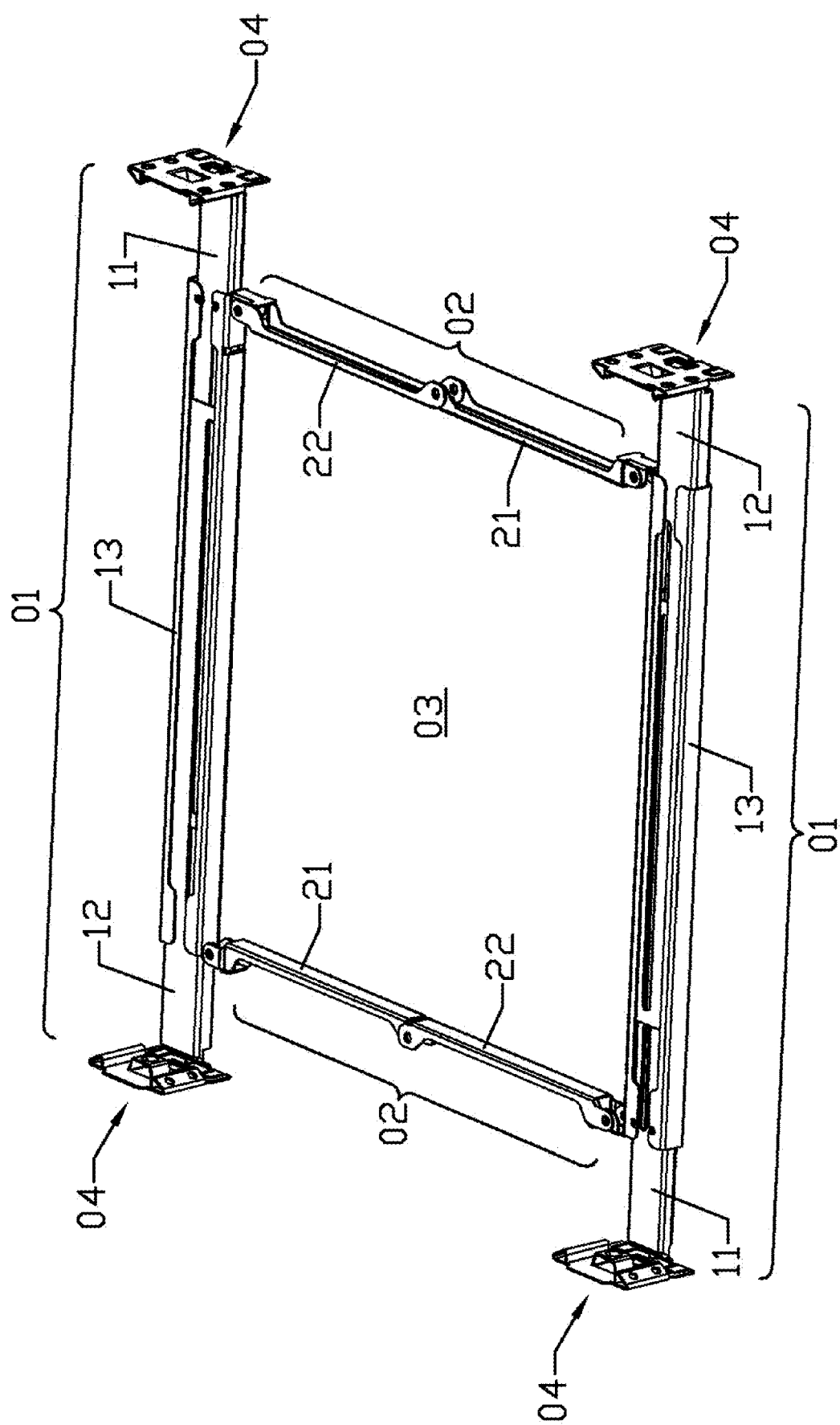
FIG. 1 is a schematic view of unfolded state of a ventilator mounting bracket of the present invention.
Figure 2:
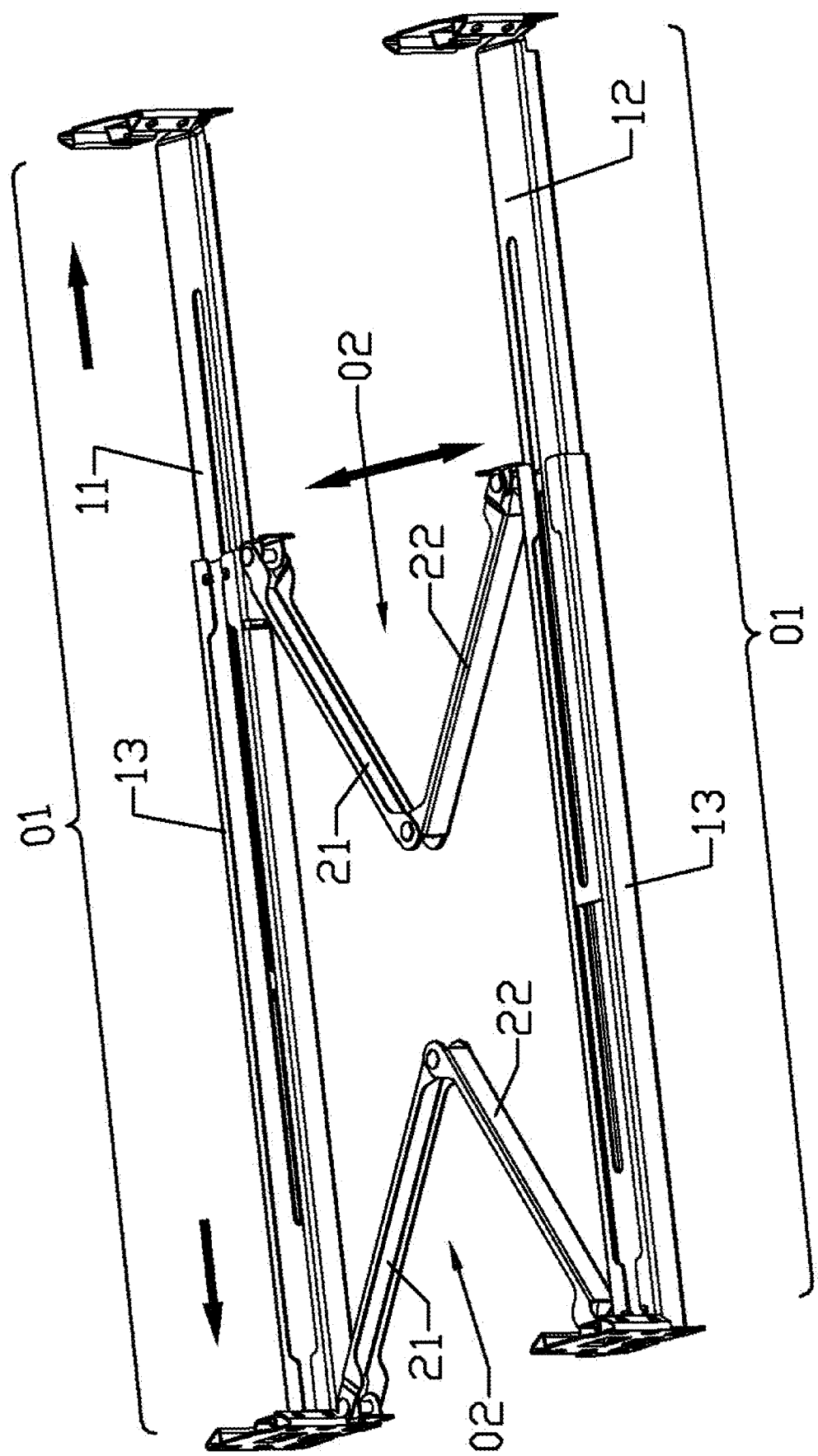
FIG. 2 is a schematic view of folded state of the ventilator mounting bracket of the present invention.
Figure 3:
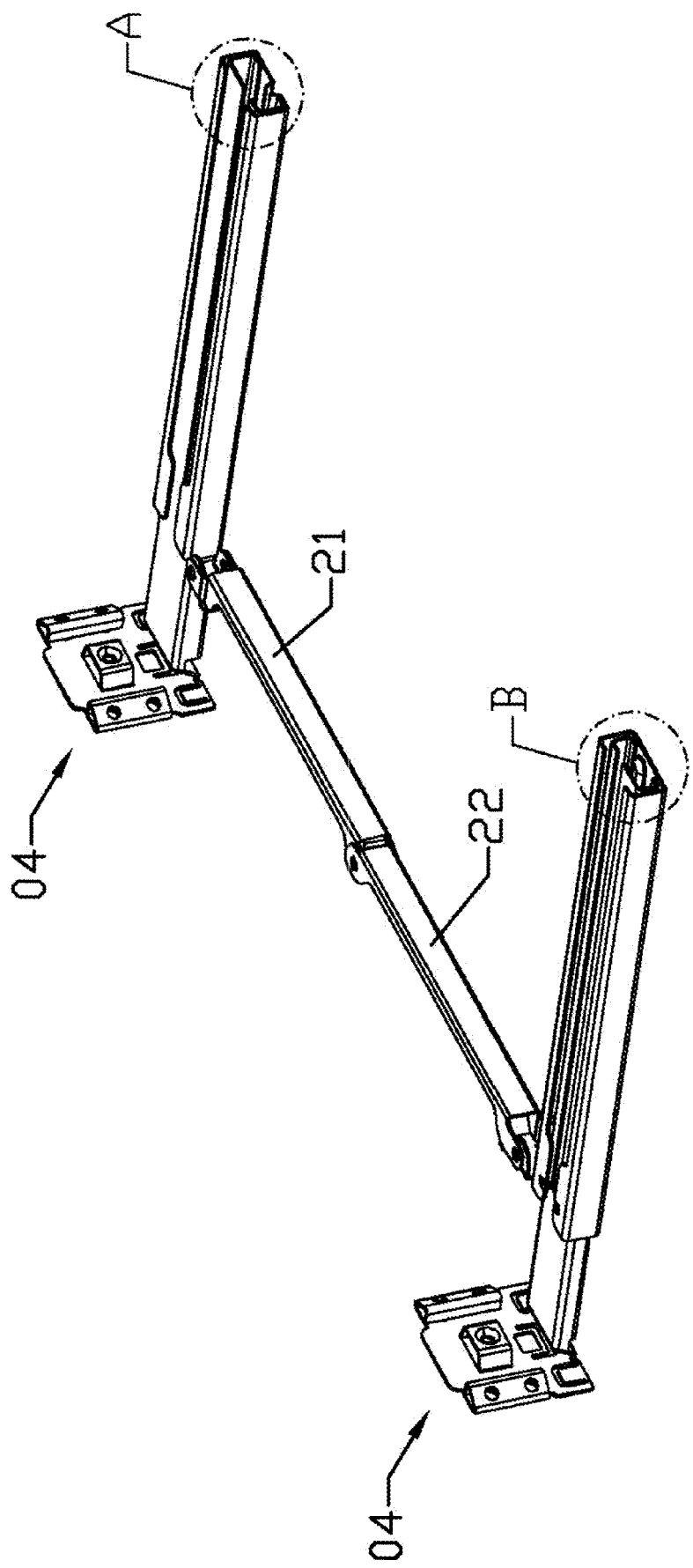
FIG. 3 is a cross section view of a telescoping rod component of the ventilator mounting bracket of the present invention.

As shown in FIG. 1-3, a ventilator mounting bracket of the present invention includes two telescoping rod components 01 which can extend and shorten and two folding rod components 02 which are connected between the two telescoping rod components and are capable of being folded and unfolded. As shown in FIG. 1, the two folding rod components 02 are unfolded to stretch the two telescoping rod components such that the two telescoping rod components and the two folding rod components form a mounting hole 03; and as shown in FIG. 2, the two folding rod components 02 are folded to drive the two telescoping rod components to withdraw. Therefore, in such folded state, the outline of the ventilator mounting bracket becomes smaller such that the ventilator mounting bracket is conveniently packaged and transported and easily placed in a ceiling, and the two ends of each one of the telescoping rod components can be conveniently fixed at the corresponding fixed positions (for example, beams) by adjusting the length of the telescoping rod components.

Figure 4:
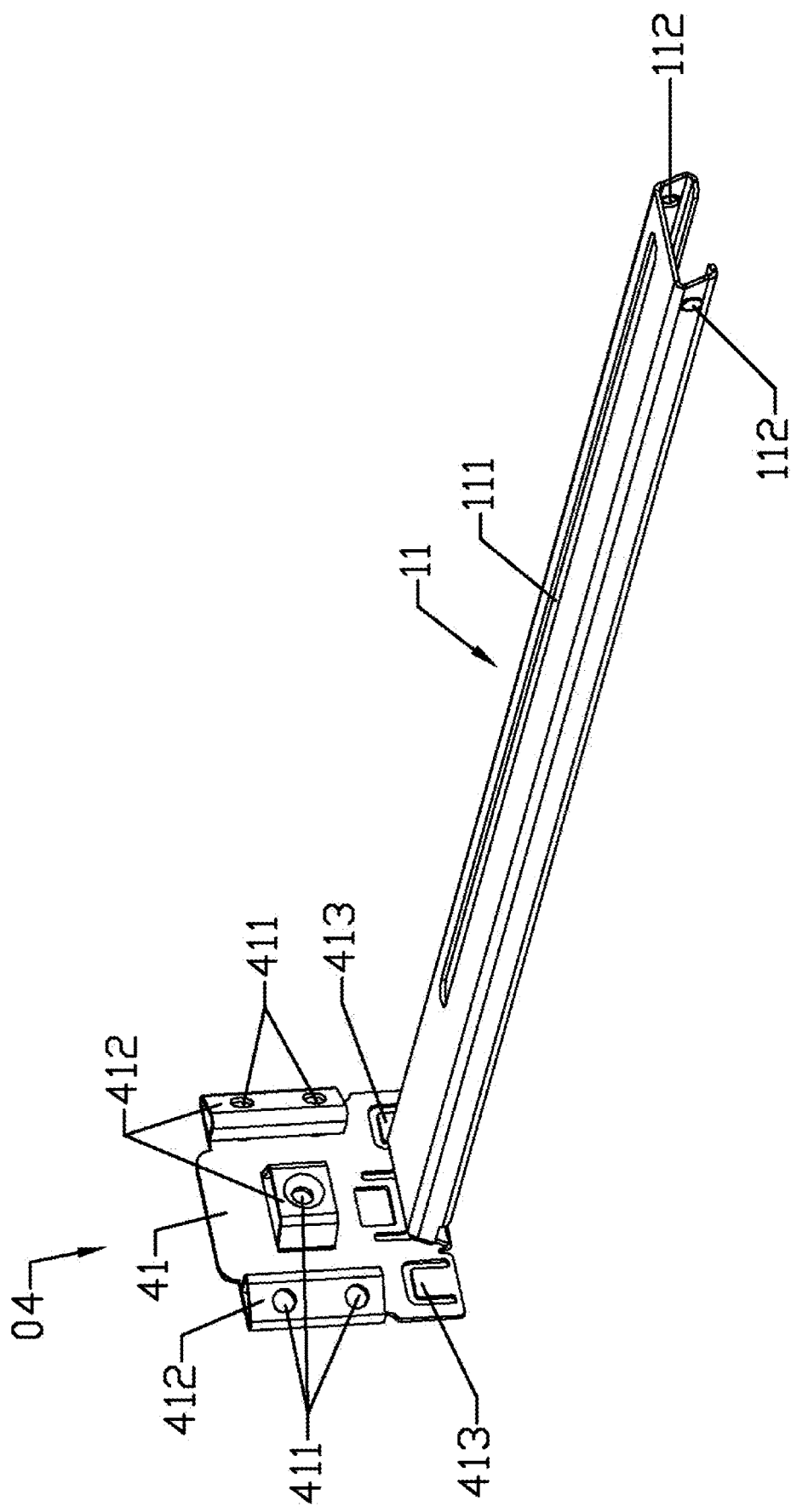
FIG. 4 is a schematic view of a first telescoping rod of the present invention.
Figure 5:
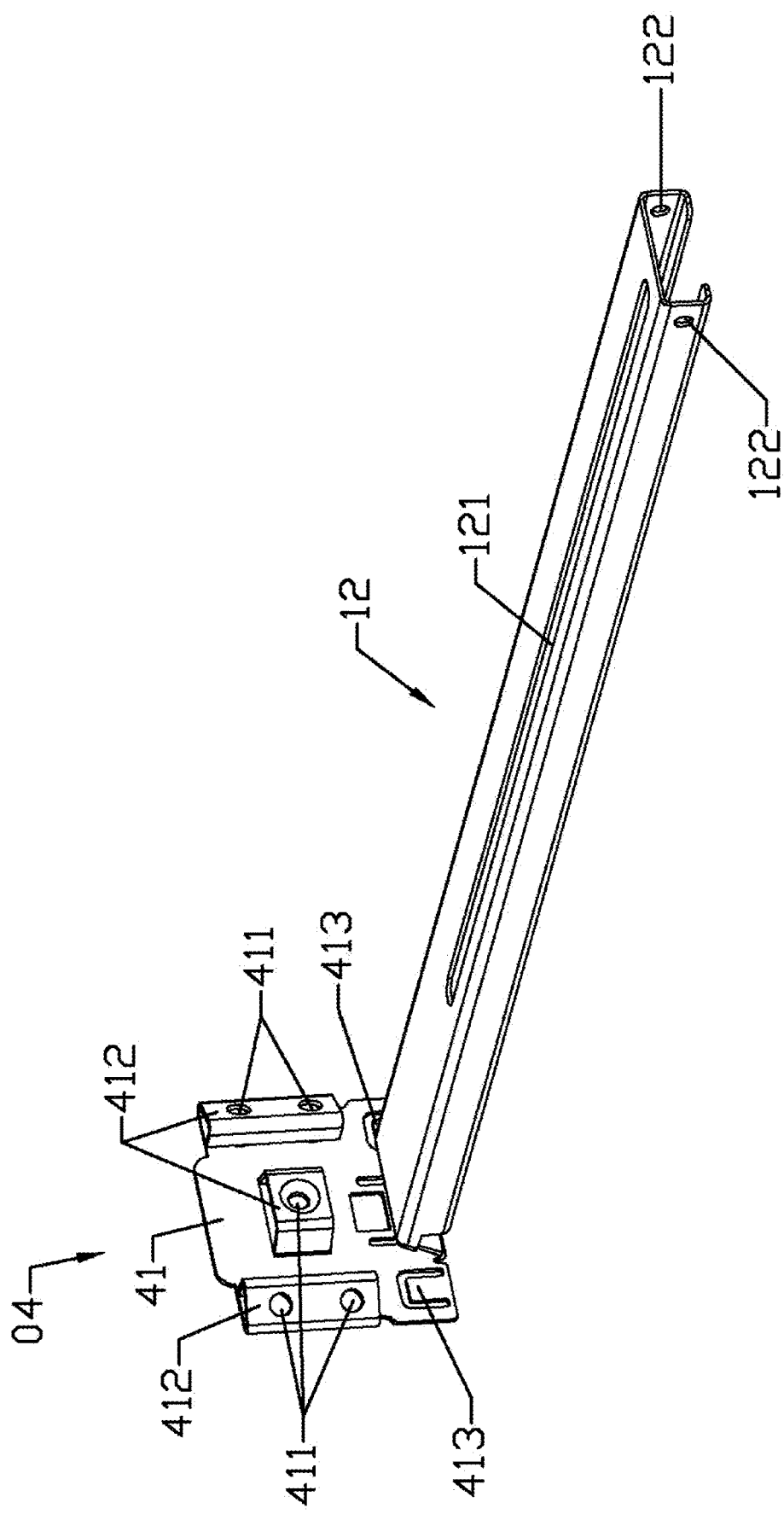
FIG. 5 is a schematic view of a second telescoping rod of the present invention.
Figure 6:
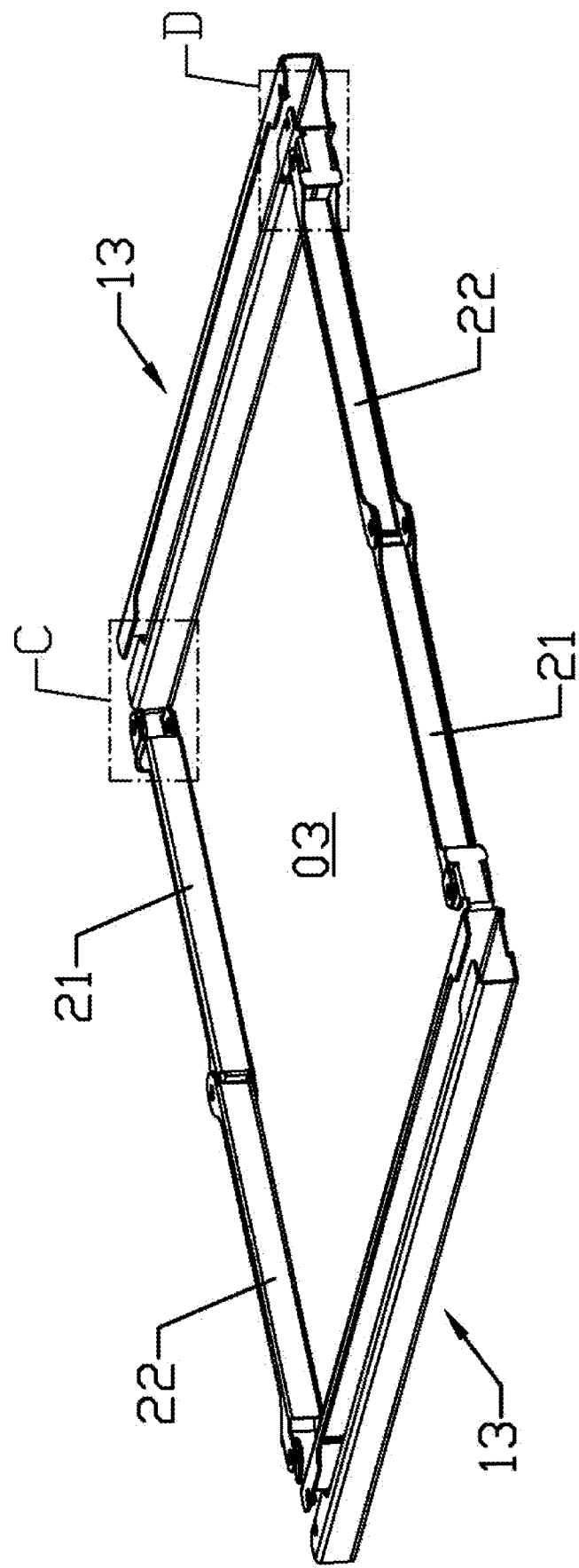
FIG. 6 is a schematic view of the telescoping rod components connected between two sliding rods of the present invention.
Figure 6A:
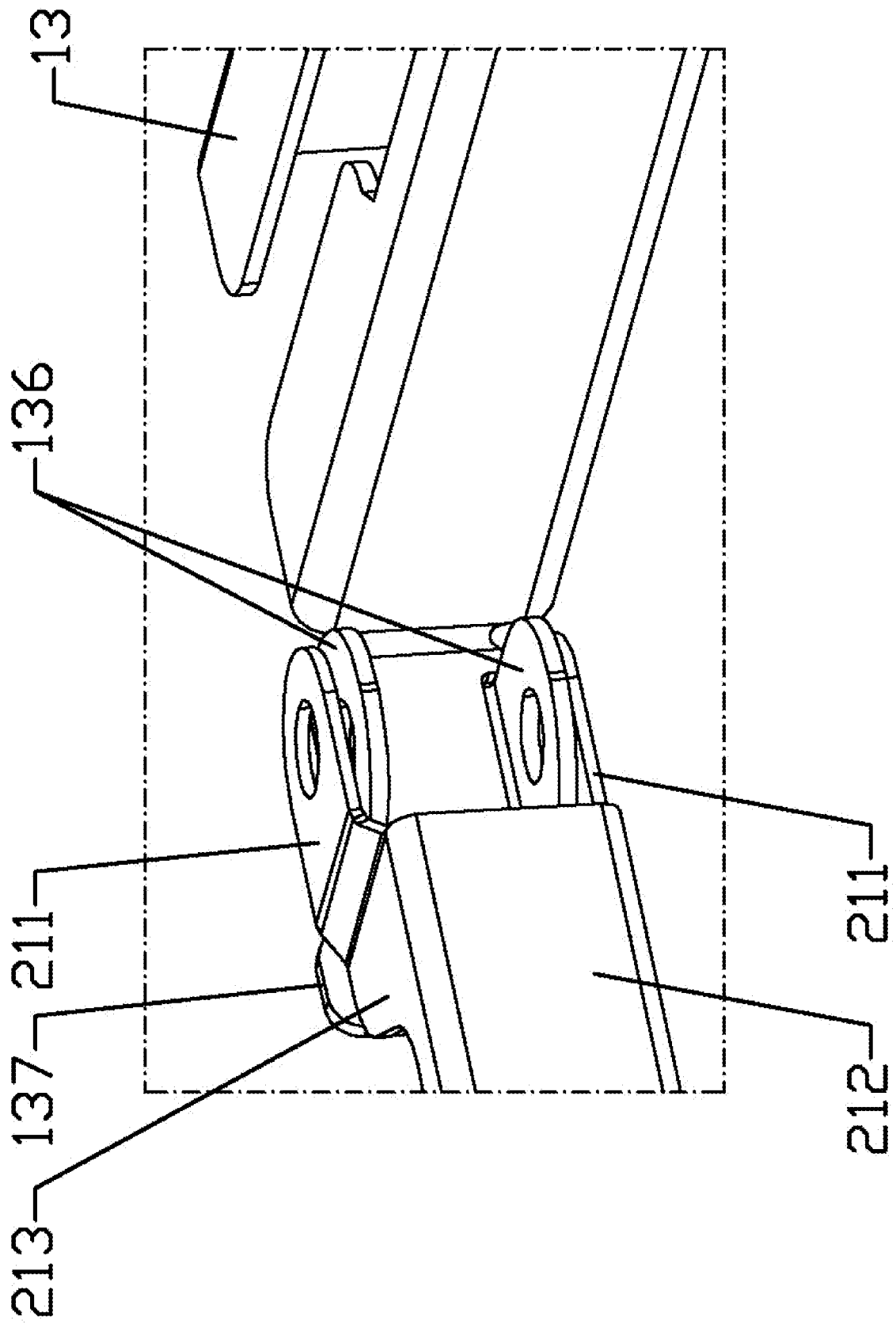
FIG. 6a is an amplified view of part C of FIG. 6.
Figure 6B:
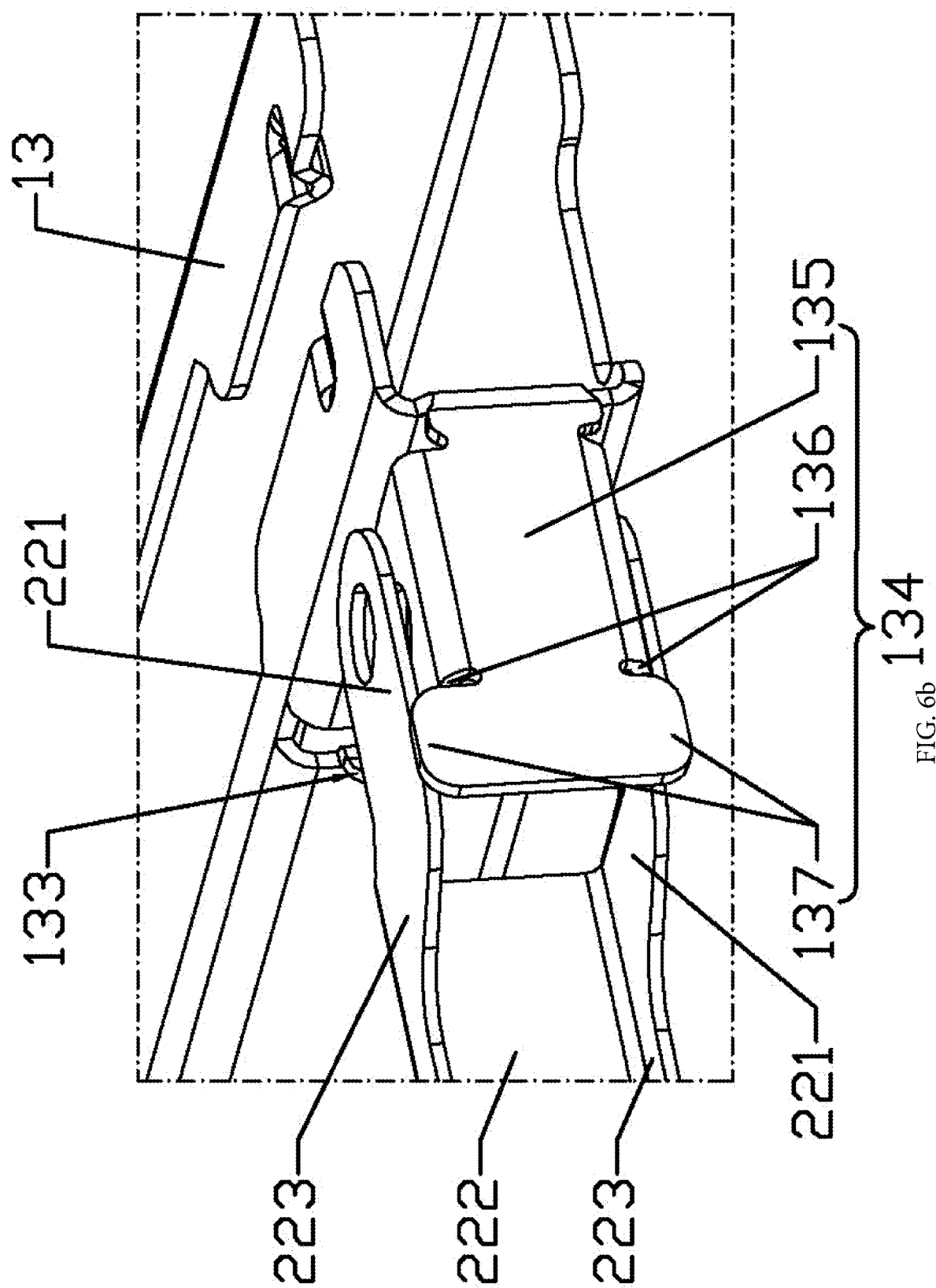
FIG. 6b is an amplified view of part D of FIG. 6.

Specifically, each one of the telescoping rod components 01 includes a first telescoping rod 11 as shown in FIG. 4, a second telescoping rod 12 as shown in FIG. 5 and a sliding rod as shown in FIG. 6-6b; each one of the first telescoping rods 11 and each corresponding one of the second telescoping rods 12 are assembled together in a telescoping way; each one of the sliding rods 13 is assembled in a sliding way on the outer side of each corresponding one of the first telescoping rods 11 and on the outer side of each corresponding one of the second telescoping rods 12; a fixture 04 (as shown in FIG. 4-5) is respectively arranged at the outer end of each one of the first telescoping rods 11 and the outer end of each one of the second telescoping rods 12; and the two ends of each one of the two folding rod components 02 are respectively rotationally connected to the sliding rods 13 of the two telescoping rod components. The first telescoping rods, the second telescoping rods, and the sliding rods are all made by blanking and bending sheet materials.

Figure 3A:
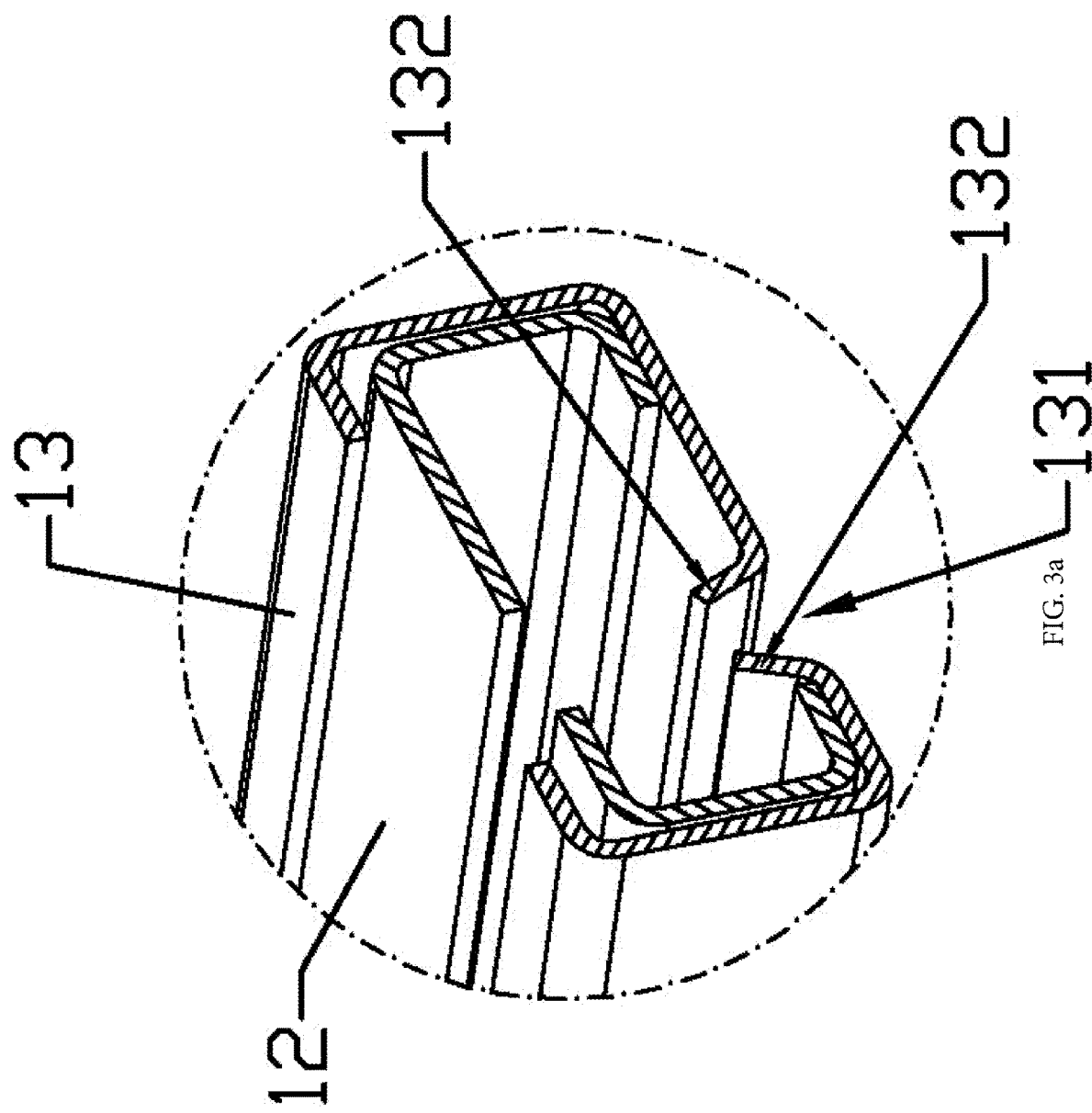
FIG. 3a is an amplified view of part A of FIG. 3.
Figure 3B:
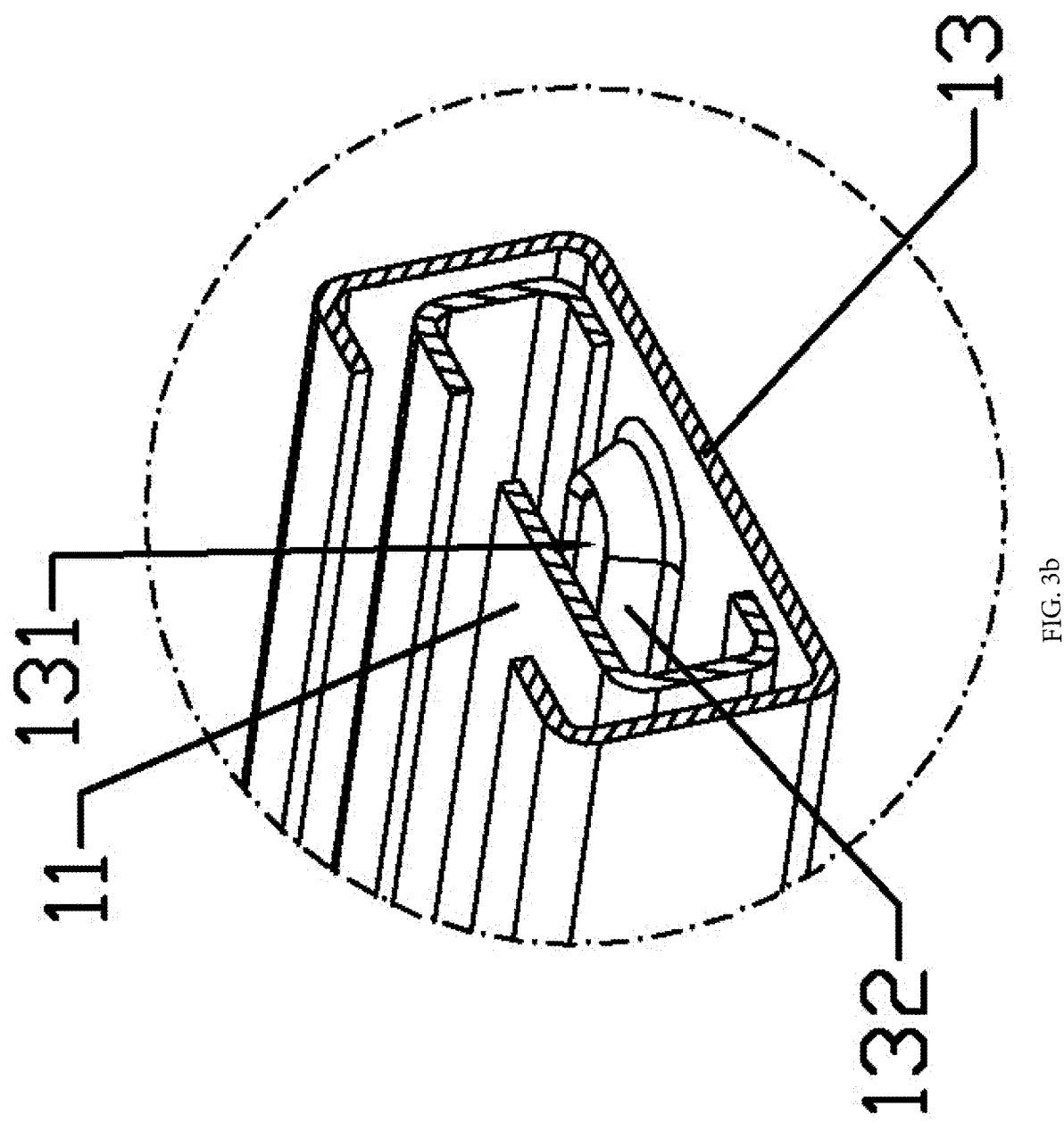
FIG. 3b is an amplified view of part B of FIG. 3.

The first telescoping rods 11 and the second telescoping rods 12 are both shaped like square pipes; each one of the first telescoping rods 11 and each corresponding one of the second telescoping rods 12 are sleeved together to realize telescoping assembling. When one first telescoping rod and one second telescoping rod are sleeved together, the outlines of parts other than the sleeved part can be identical, or one is smaller and the other is bigger, and the figure shows the situation where the outline of the first telescoping rod is smaller than that of the second telescoping rod. Each one of the sliding rods 13 is shaped like a square pipe and is externally sleeved on each corresponding one of the first telescoping rods and each corresponding one of the second telescoping rods to realize sliding assembly with each corresponding one of the first telescoping rods and each corresponding one of the second telescoping rods. As shown in FIG. 3a-3b, when the outline of the first telescoping rod is smaller than the outline of the second telescoping rod, the sliding rod contacts the second telescoping rod while keeping a distance from the first telescoping rod; when the outlines of parts other than the sleeved part of the first telescoping rod and the second telescoping rods are identical, the sliding rod contacts the first telescoping rod and the second telescoping rod at the same time.

A slot 131 or slit is formed at the bottom face of each one of the sliding rods 13; the two sides of the slot 131 or slit are symmetrical threaded-connection folding sides 132 for connecting screws (in particular self-taping screws), and a ventilator is suspended and fixed through screws. Preferably, the threaded-connection folding sides 132 are bent upward. Due to such structure, the threaded-connection folding sides are pulled down by the screw to be bent downward after the screw is connected, so that the two threaded-connection folding sides get closer to each other to extrude the screw, ensuring a reliable screw connection and avoiding the screw from sliding off from the threaded-connection folding sides.

To avoid interfering with the insertion of the screw, the bottom face of each one of the first telescoping rods 11 and the bottom face of each one of the second telescoping rods 12 are provided with a concession slot 111, 121 or a concession slit corresponding to the slot or slit.

The inner end of each one of the first telescoping rods 11 and the inner end of each one of the second telescoping rods 12 are respectively formed with a pit 122 and a projection 112, and each one of the projections is inserted into each corresponding one of the pits to avoid separating each one of the first telescoping rods from each corresponding one of the second telescoping rods.

Refer to FIG. 4-5. The fixtures 04 are vertical portions 41 which are respectively arranged at the outer end of each one of the first telescoping rods 11 and at the outer end of each one of the second telescoping rods 12 and extend upward. As shown in the figures, the vertical portions are formed by bending from the outer end of each one of the first telescoping rods 11 and the outer end of each one of the second telescoping rods 12, and each one of the vertical portions is formed with a fastening hole 411 through which a fastener such as a screw passes to fix the vertical portion 411 at the fixed position such as a beam 06 of a ceiling (refer to FIG. 7). Refer to FIG. 4-5. In order to enhance the strength of the vertical portions, each one of the vertical portions is provided with a structure reinforcing portion 412, and each one of the fastening holes 411 is formed on each corresponding one of the structure reinforcing portions 412. Preferably, the structure reinforcing portions 412 are folding sides or flanges formed by bending and deforming from the vertical portions.

Refer to FIG. 4-5. To facilitate positioning during installation, each one of the vertical portions 411 is provided with a positioning sheet 413 which is capable of bending outward. During installation, each one of the positioning sheets is bent outward to protrude out of each corresponding one of the vertical portions such that each one of the positioning sheets 413 is pressed against the bottom face of each corresponding one of the beams 06 (refer to FIG. 9)

Figure 9:
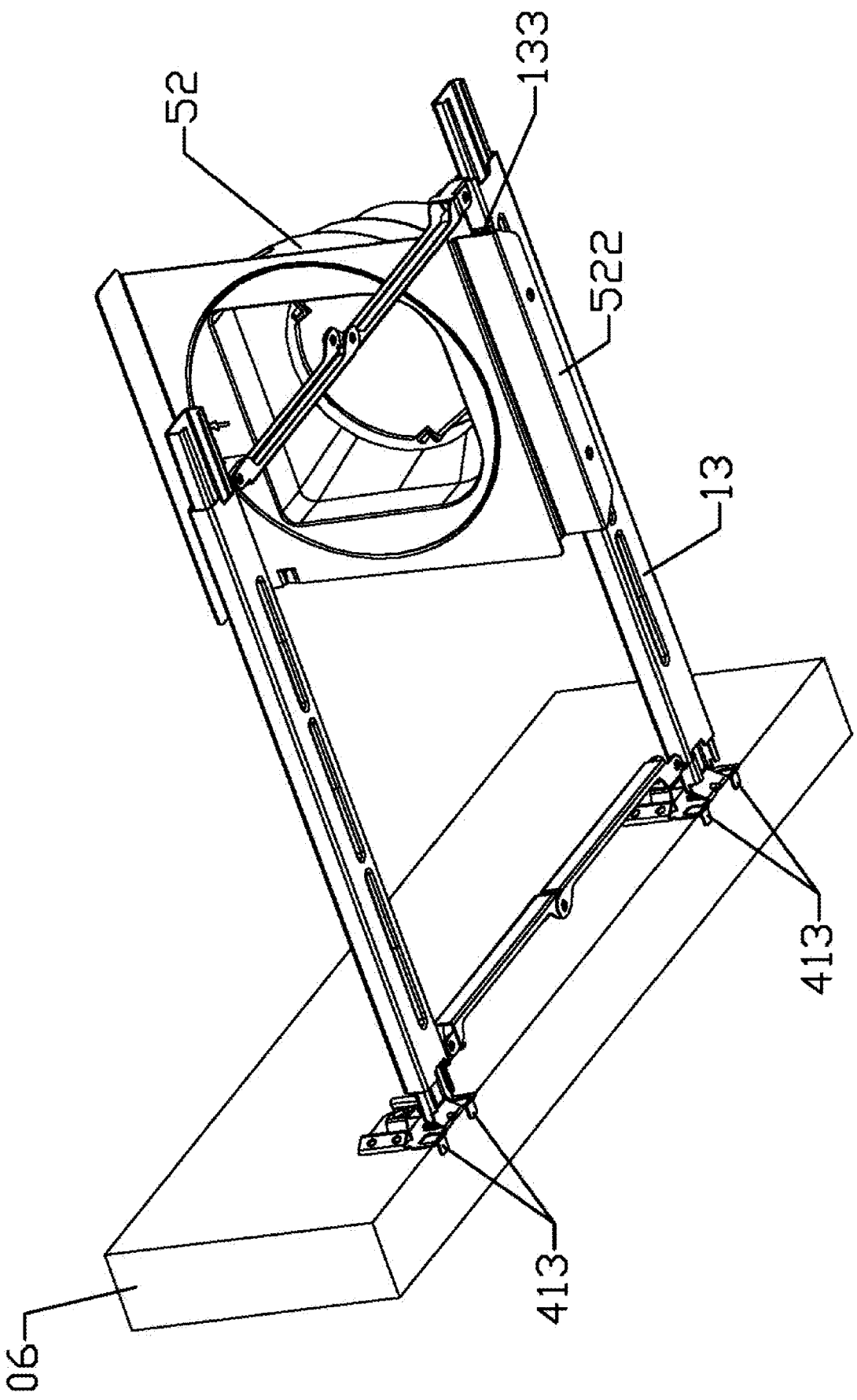
FIG. 9 is a schematic view of an air pipe interface part as shown in FIG. 8 installed on the mounting bracket as shown in FIG. 7.

Refer to FIG. 6b and FIG. 9. To position the ventilator during installation of the ventilator, each one of the sliding rods 13 is provided with a positioning flange 133 on a lateral face toward the mounting hole. During installation of the ventilator, the ventilator is pressed against the positioning flanges to be positioned.

Refer to FIG. 1-3. Each one of the folding rod components 02 includes a first folding rod 21 and a second folding rod 22; one end of each one of the first folding rods is in a rotational connection with one end of each corresponding one of the second folding rods, while the other end of each one of the first folding rods and the other end of each one of the second folding rods are respectively rotationally connected to the sliding rods 13 of the two telescoping rod components. The first folding rods and the second folding rods are folded and unfolded to stretch or retrieve the two telescoping rod components. The first folding rods and the second folding rods are preferably made by blanking and bending sheet materials.

Specifically, as shown in FIG. 6b, each one of the sliding rods 13 is provided with a pivoting seat 134 at each one of the two ends of the lateral face toward the mounting hole 03; the other end of each one of the first folding rods is rotationally connected to the pivoting seat on the sliding rod of one of the telescoping rod components, and the other end of each one of the second folding rods is rotationally connected to the pivoting seat on the sliding rod of the other telescoping rod component.

Preferably, as shown in FIG. 6b, each one of the pivoting seats 134 includes a vertical folding side 135 and two transverse folding sides 136 which are bent toward the mounting hole symmetrically from the top and bottom edges of the vertical folding side 135 and perform rotational connection. The ends, in adjacent connection with the transverse folding sides 136, of each one of the vertical folding sides 135 respectively extend up and down to form positioning blocking portions 137 for preventing the first folding rods and the second folding rods from excessively expanding out of the mounting hole.

Each one of the first folding rods 21 and the second folding rods 22 includes vertical walls 212, 222 and transverse walls 213, 223 which are formed by symmetrically bending from the upper and lower margins of the corresponding vertical walls. Therefore, from the appearance point of view, the vertical walls and the transverse walls form a groove which has a square cross section and faces a lateral face; the two ends of each one of the transverse walls extend to form connecting lugs 211, 221; the connecting lug of one end of each one of the first folding rods is rotationally connected through a shaft with the connecting lug of one end of each one of the second folding rods, the connecting lug of the other end of each one of the first folding rods is rotationally connected through a shaft with the transverse folding sides of one of the sliding rods, and the connecting lug at the other end of each one of the second folding rods is connected through a shaft with the connecting lug at the transverse folding sides of the other sliding rod.

Figure 7:
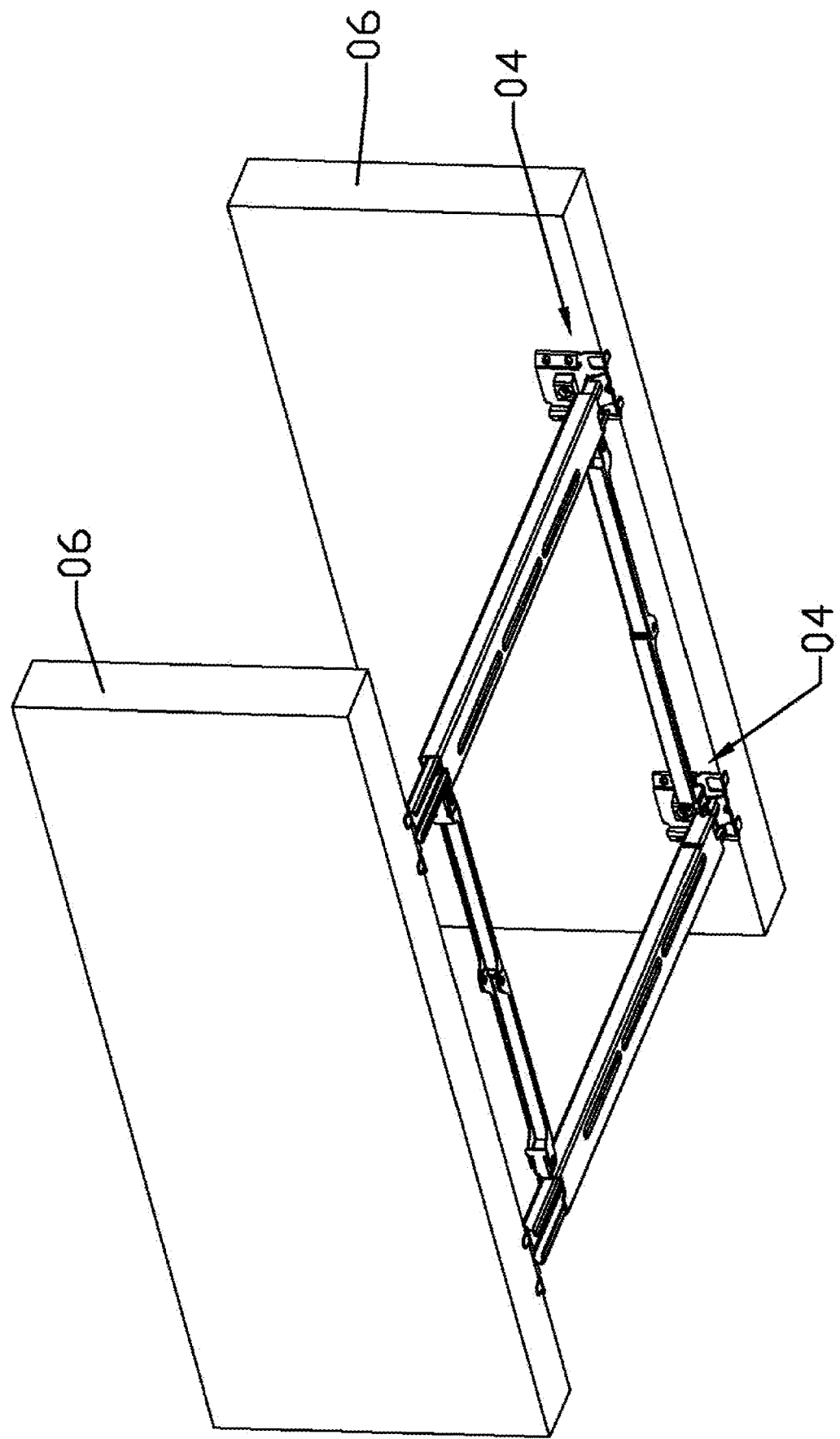
FIG. 7 is a schematic view of the ventilator mounting bracket of the present invention fixedly installed on two beams of a new house.

In the case of mounting a ventilator in a new house without a ceiling, first, the mounting bracket is installed on beams. Refer to FIG. 7 and FIG. 9. The positioning sheets 413 on the vertical portions are bent and unfolded outward; the two folding rod components 02 are unfolded to the maximum state; then the positioning sheet 413 at one end of each one of the two telescoping rod components 01 fits the bottom face of each corresponding one of the beams 06 and the vertical portion 41 at the end is pressed against the lateral face of the beams 06; next, the telescoping rod components 01 are stretched such that the vertical portion at the other end of each one of the telescoping rod components is pressed against the lateral face of another beam and the positioning sheet at the other end fits the bottom face of the another beam; and finally, a screw passes through the fastening hole 411 of each one of the vertical portions and is fastened on each corresponding one of the beams, thus completing the installation of the mounting bracket.

Second, the ventilator is installed on the mounting bracket. Refer to FIG. 9, a bottom flange 522 of an air pipe interface part 52 fits the bottom face of each one of the sliding rods 13 at first, while the bottom flange 522 of the air pipe interface part 52 is pressed against each one of the positioning flanges 133 from one side; then, a self-tapping screw is penetrated through the mounting hole on the bottom flange 522 and is fastened at the threaded-connection folding side 132 of each one of the sliding rods 13. Thus, the air pipe interface part is fixed on the mounting bracket.

Figure 10:
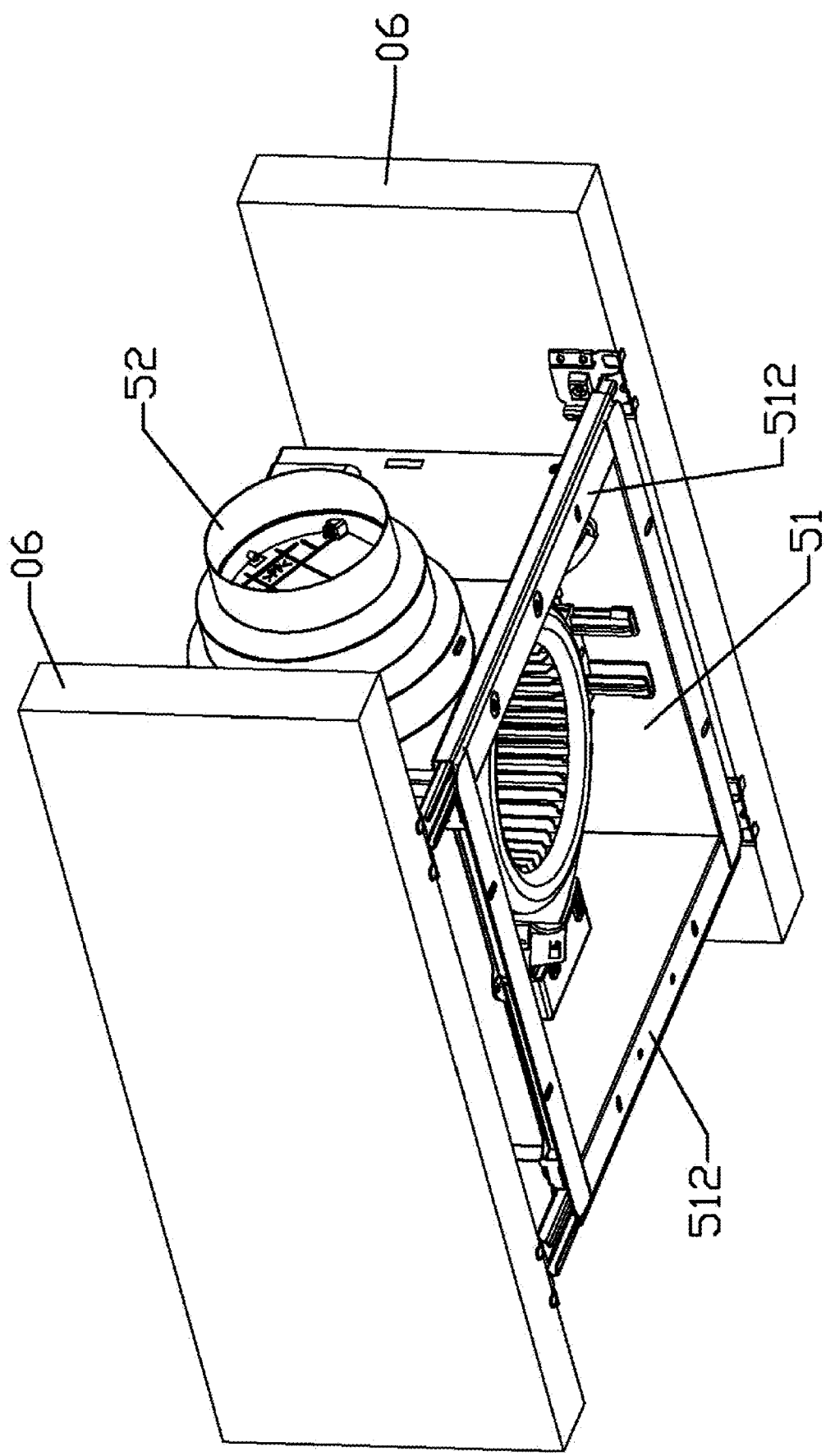
FIG. 10 is a schematic view of the whole ventilator as shown in FIG. 8 installed on the mounting bracket as shown in FIG. 7.

Finally, a case 51 is installed. Refer to FIG. 10. A concave portion 511 on a lateral face of a ventilator case is aligned with the air pipe interface portion 52; the case is placed upward in the mounting hole; the lateral edges of the air pipe interface port 52 are clamped into the concave portion 511 until a protrusion 521 of the air pipe interface part is clamped with a clamping hole 513 on the case; the case is temporarily fixed and then can be released from the grip of the hands. Then, similar to the method for fixing the air pipe interface part, the self-tapping screw is penetrated through the mounting hole on the flange 512 of the case and is fastened at the threaded-connection folding side 132 of each one of the sliding rods 13, and then the case is fixed on the mounting bracket.

After the installation of the ceiling is completed, a panel of the ventilator is connected with the case, and the panel fits the lower face of the ceiling and covers the case.

Figure 11:
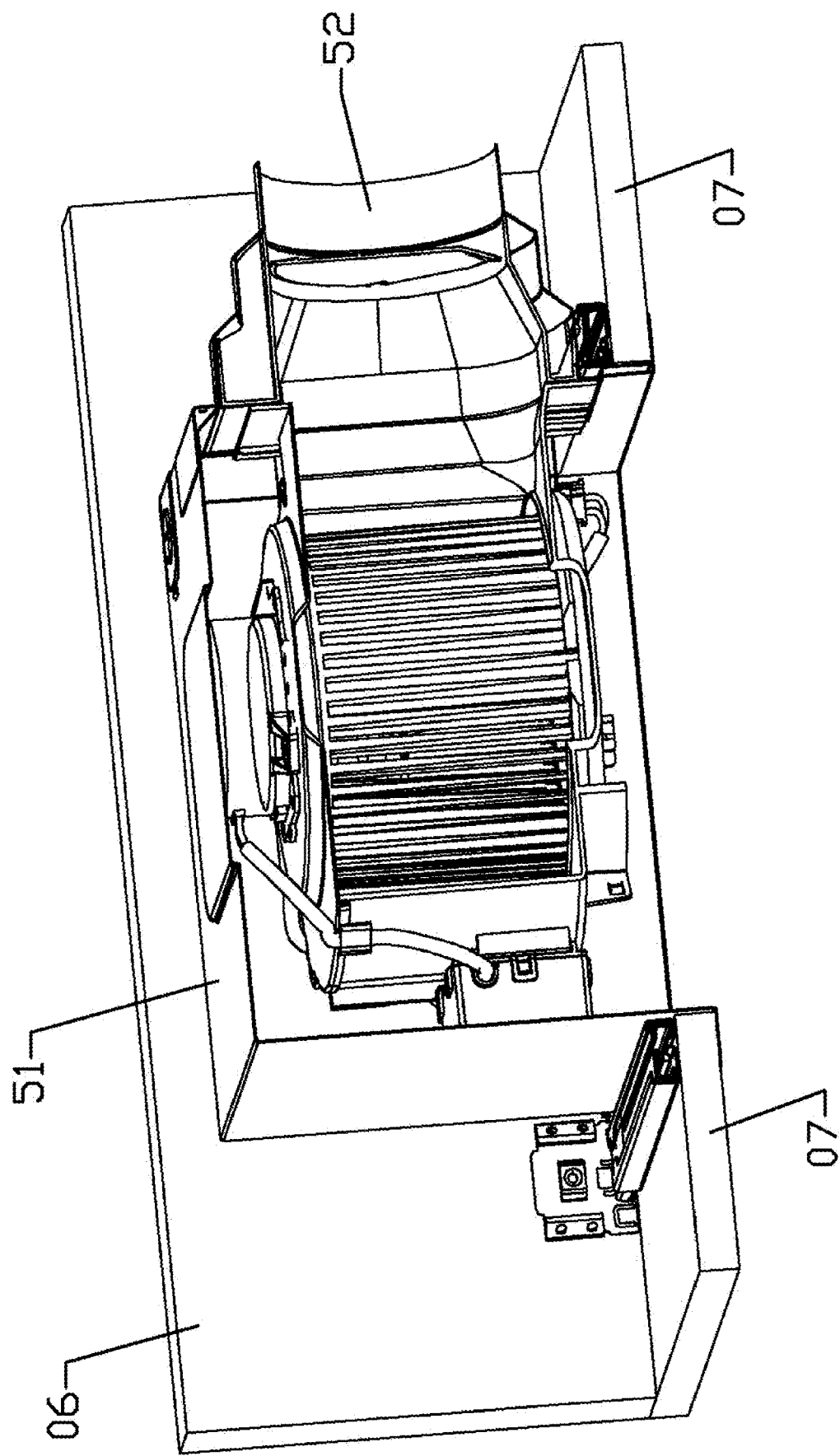
FIG. 11 is a schematic view of the ventilator mounting bracket of the present invention fixedly installed in an old house and equipped with a ventilator.

As shown in FIG. 11, to install the ventilator after the ceiling is installed, the ceiling is formed with an opening with a dimension a little larger than that of the ventilator case. First, the mounting bracket is adjusted to the minimum outline such that the mounting bracket can be inserted into the opening of the ceiling in an inclined way and then unfolded and placed on the ceiling; next, the length of the telescoping rod components 01 is adjusted such that the length of the telescoping rod components is equal to the distance between two adjacent beams 06; the sliding rods 13 are moved to adjust the length of the sliding rods; the folding rod components 02 are unfolded; and the position of the mounting hole 03 is adjusted such that the opening of the ceiling is located within the range of the mounting hole. Then, fasteners such as screws are penetrated into corresponding fastening holes 411 and fastened on the beams. Thus, the installation of the mounting bracket is completed.

The next installation steps are identical with the installation steps for new houses. First, the ventilator is installed on the mounting bracket. The bottom flange 522 of the air pipe interface part fits the bottom face of each one of the sliding rods 13 at first, while the bottom flange 522 of the air pipe interface part 52 is pressed against each one of the positioning flanges 133 from one side; then, the self-tapping screw is penetrated through the mounting hole on the bottom flange 522 and is fastened at the threaded-connection folding side 132 of each one of the sliding rods. Thus, the air pipe interface part is fixed on the mounting bracket. Then, the case is installed on the mounting bracket. The concave portion 511 on the lateral face of the ventilator case is aligned with the air pipe interface portion 52; the case is placed upward in the mounting hole; the flanges on two sides of the air pipe interface port 52 are clamped into the concave portion 511 until the protrusion 521 of the air pipe interface part is clamped with the clamping hole 513 on the case; the case is temporarily fixed and then can be released from the grip of hands. Then, similar to the method for fixing the air pipe interface part, the self-tapping screw is penetrated through the mounting hole on the flange 512 of the case and is fastened at the threaded-connection folding side 132 of each one of the sliding rods 13, and then the case is fixed on the mounting bracket.

Finally, a panel of the ventilator is connected with the case, and the panel fits the lower face of the ceiling panel and covers the case.

Specifically, beams as the fixed parts may be keels.

Figure 8:
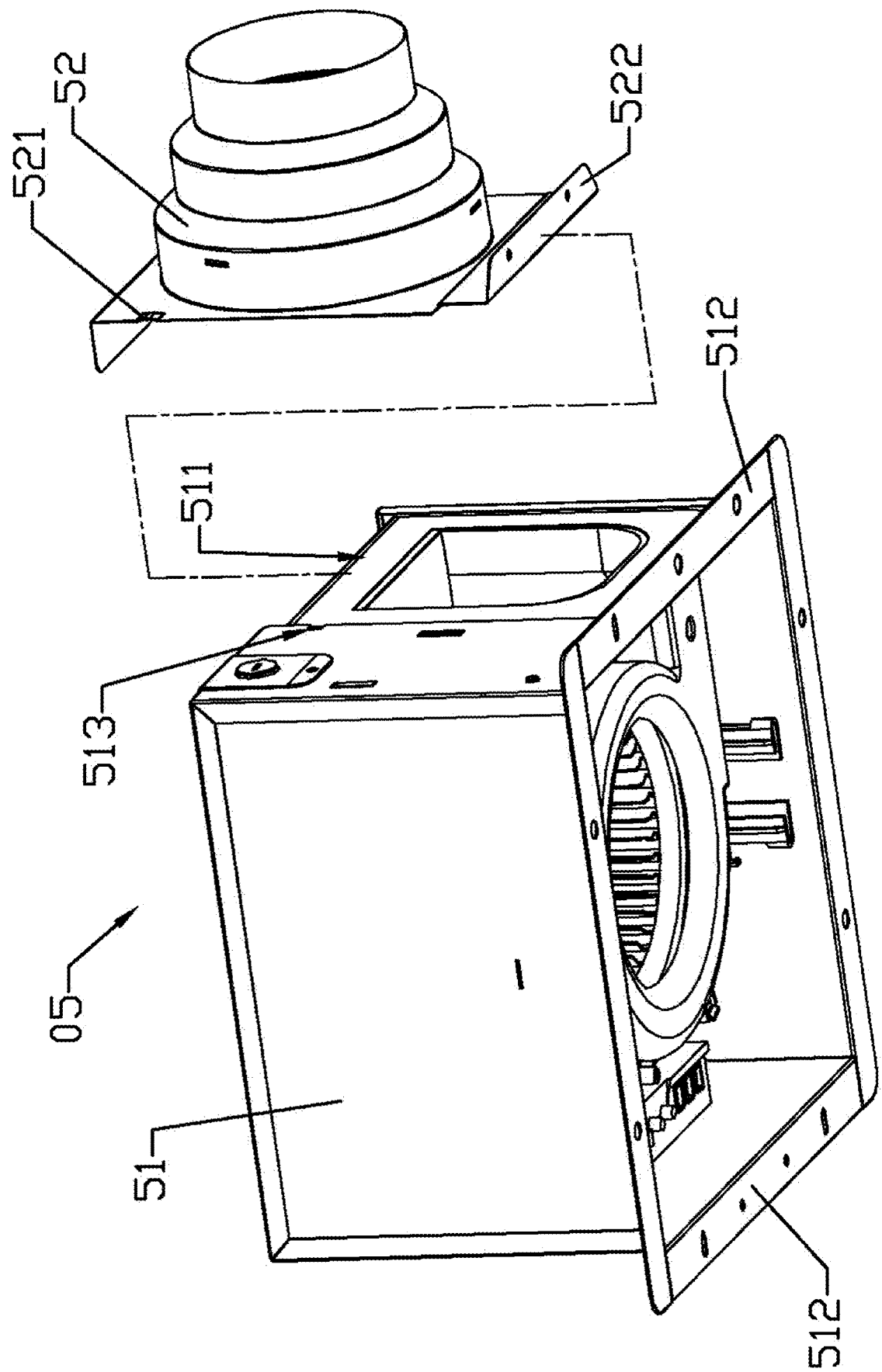
FIG. 8 is a schematic view of a ventilator.

FIG. 8 illustrates a ventilator of which an air pipe interface port and a case are split. During specific installation, the mounting bracket can also be used to install the ventilator of which the air pipe interface and the case are split

What is claimed is:

1. A ventilator mounting bracket, characterized by comprising two telescoping rod components (01) which can extend and shorten and two folding rod components (02) which are connected between the two telescoping rod components and are capable of being folded and unfolded, wherein the two folding rod components are unfolded to stretch the two telescoping rod components such that the two telescoping rod components and the two folding rod components form a mounting hole (03); and the two folding rod components are folded to drive the two telescoping rod components to withdraw;

wherein each one of the telescoping rod components (01) comprises a first telescoping rod (11), a second telescoping rod (12) and a sliding rod (13); each one of the first telescoping rods (11) and each corresponding one of the second telescoping rods (12) are assembled together in a telescoping way; each one of the sliding rods (13) is assembled in a sliding way on the outer side of each corresponding one of the first telescoping rods (11) and on the outer side of each corresponding one of the second telescoping rods (12); a fixture (04) is respectively arranged at the outer end of each one of the first telescoping rods (11) and the outer end of each one of the second telescoping rods (12); and the two ends of each one of the two folding rod components (02) are respectively rotationally connected to the sliding rods (13) of the two telescoping rod components.

2. The ventilator mounting bracket according to claim 1, wherein the first telescoping rods (11) and the second telescoping rods (12) are both shaped like square pipes; each one of the first telescoping rods (11) and each corresponding one of the second telescoping rods (12) are sleeved together to realize telescoping assembling; each one of the sliding rods (13) is shaped like a square pipe and is externally sleeved on each corresponding one of the first telescoping rods and each corresponding one of the second telescoping rods to realize sliding assembly with each corresponding one of the first telescoping rods and each corresponding one of the second telescoping rods.

3. The ventilator mounting bracket according to claim 1, wherein each one of the fixtures (04) is a vertical portion (41) which is respectively arranged at the outer end of each corresponding one of the first telescoping rods (11) and at the outer end of each corresponding of the second telescoping rods (12) and extends upward, and each one of the vertical portions (41) is formed with a fastening hole (411).

4. The ventilator mounting bracket according to claim 3, wherein each one of the vertical portions (41) is provided with a structure reinforcing portion (412), and each one of the fastening holes (411) is formed on each corresponding one of the structural reinforcing portions (412).

5. The ventilator mounting bracket according to claim 3, wherein each one of the vertical portions (41) is provided with a positioning sheet (413) which is capable of being bent outward.

6. The ventilator mounting bracket according to claim 1, wherein each one of the sliding rods (13) is provided with a positioning flange (133) on a lateral face toward the mounting hole (03).

7. The ventilator mounting bracket according to claim 1, wherein the first telescoping rods (11), the second telescoping rods (12) and the sliding rods (13) are all made by blanking and bending sheet materials.

8. The ventilator mounting bracket according to claims 1, wherein each one of the folding rod components (02) comprises a first folding rod (21) and a second folding rod (22); one end of each one of the first folding rods (21) is in a rotational connection with one end of each corresponding one of the second folding rods (22), while the other end of each one of the first folding rods (21) and the other end of each one of the second folding rods (22) are respectively rotationally connected to the sliding rods (13) of the two telescoping rod components.

9. The ventilator mounting bracket according to claim 8, wherein each one of the sliding rods (13) is provided with a pivoting seat (134) at each one of the two ends of the lateral face toward the mounting hole (03); the other end of each one of the first folding rods is rotationally connected to the pivoting seat on the sliding rod of one of the telescoping rod components, and the other end of each one of the second folding rods is rotationally connected to the pivoting seat on the sliding rod of the other telescoping rod component.

10. The ventilator mounting bracket according to claim 9, wherein each one of the pivoting seats (134) comprises a vertical folding side (135) and two transverse folding sides (136) which are bent toward the mounting hole symmetrically from the top and bottom edges of the vertical folding side (135) and perform rotational connection.

11. The ventilator mounting bracket according to claim 10, wherein ends, in adjacent connection with the transverse folding sides (136), of each one of the vertical folding sides (135) respectively extend up and down to form positioning blocking portions (137).

12. The ventilator mounting bracket according to claim 10, wherein each one of the first folding rods (21) and the second folding rods (22) includes vertical walls (212, 222) and transverse walls (213, 223) which are formed by symmetrically bending from the upper and lower edges of the corresponding vertical walls; the vertical walls and the transverse walls form a groove which has a square cross section and faces a lateral face; the two ends of each one of the transverse walls extend to form connecting lugs (211, 221); the connecting lug of one end of each one of the first folding rods is rotationally connected through a shaft with the connecting lug of one end of each corresponding one of the second folding rods, the connecting lug of the other end of each one of the first folding rods is rotationally connected through a shaft with the transverse folding sides of one of the sliding rods, and the connecting lug at the other end of each one of the second folding rods is connected through a shaft with the connecting lug at the transverse folding sides of the other sliding rod.

13. The ventilator mounting bracket according to claim 8, wherein the first folding rods and the second folding rods are all made by blanking and bending sheet materials.

\* \* \* \* \*